D. J. HURLEY & F. W. SLAGER.
FASTENING DEVICE FOR AUTOMOBILE CLOCKS.
APPLICATION FILED JAN. 11, 1909.
914,280.
Patented Mar. 2, 1909.
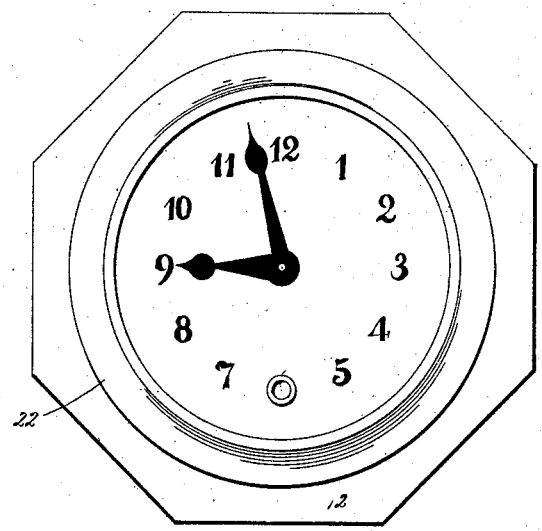
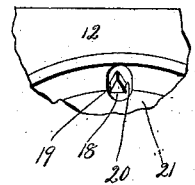
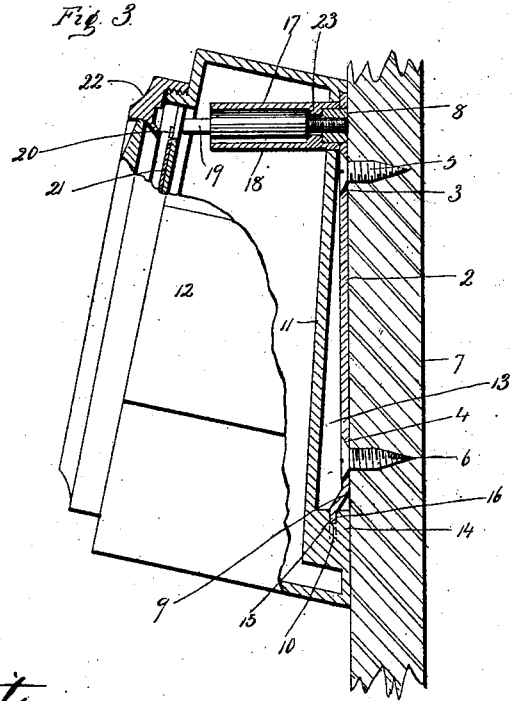
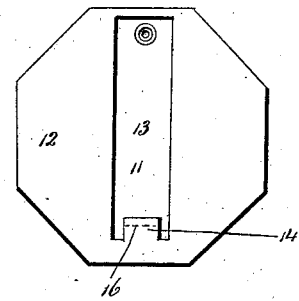
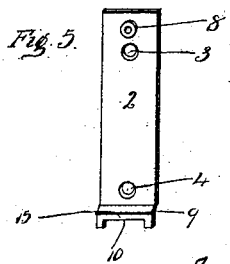
Witnesses
C. J. Reed.
C. L. Weed
Inventors
Daniel J. Hurley
and Frank W. Slager
by Seymour & Earle
Attys
THE NORRIS PETERS CO., WASHINGTON, D. C.

UNITED STATES PATENT OFFICE.

DANIEL J. HURLEY AND FRANK W. SLAGER, OF NEW HAVEN, CONNECTICUT, ASSIGNORS TO NEW HAVEN CLOCK CO., OF NEW HAVEN, CONNECTICUT, A CORPORATION.

FASTENING DEVICE FOR AUTOMOBILE-CLOCKS.

No. 914,280.   Specification of Letters Patent.   Patented March 2, 1909.

Application filed January 11, 1909. Serial No. 471,788.

*To all whom it may concern:*

Be it known that we, DANIEL J. HURLEY and FRANK W. SLAGER, citizens of the United States, residing at New Haven, in the county of New Haven and State of Connecticut, have invented a new and useful Improvement in Fastening Devices for Automobile-Clocks; and we do hereby declare the following, when taken in connection with the accompanying drawings and the numerals of reference marked thereon, to be a full, clear, and exact description of the same, and which said drawings constitute part of this specification, and represent, in—

Figure 1 a view in front elevation of the clock. Fig. 2 a broken view of the clock with the bezel removed so as to expose the opening in the dial and the projecting end of the triangular stem of the fastening arbor. Fig. 3 a view of the clock in vertical section showing a portion of the automobile dash-board. Fig. 4 a view in rear elevation of the clock drawn on a smaller scale and showing the recess in the back of its case. Fig. 5 a detached perspective view of the anchor-plate.

Our invention relates to an improvement in fastening devices for automobile clocks, the object being to provide a simple, strong and convenient fastening device constructed with particular reference to being entirely concealed and protected by the clock-case when the same is in position.

With these ends in view our invention consists in the construction and combination of parts to be hereinafter described and pointed out in the claims.

In carrying out our invention we employ what, for want of a better term, we shall henceforth call an anchor-plate 2 provided with countersunk screw holes 3, 4, for the reception of screws 5 and 6 entering the dashboard 7 or other part of an automobile frame to which the said anchor-plate is in this way permanently attached in a vertical position. At its upper end the plate is provided with an internally threaded bushing 8, while its lower end is bent forward to form a hook 9 having a centering notch 10 For its application to an anchor-plate constructed as above described, the back 11 of the polygonal case 12 of an automobile clock is formed with a vertical centrally arranged recess 13 extending from the top to nearly the bottom of the said back 11, and increasing in depth from its upper to its lower end, as clearly shown in Fig. 3. An integral lug 14 rising within the center of the lower end of the recess 13, is made a trifle narrower than the slot 10 in the hook 9 so as to permit the lug to enter the said slot for the entrance of the edge 15 of the hook into a groove 16 in the top of the lug, as shown in Fig. 3.

A bearing tube 17 mounted in the upper end of the back 11 of the clock-case extends horizontally forward therein and provides a bearing for a fastening-arbor 18 having its forward end furnished with a triangular stem 19 for the reception of a key having a corresponding key-hole. The said stem 19 projects forward through an opening 20 in the center of the upper edge of the dial 21 at a point concealed by the bezel 22 when the same is in place. The opposite end of the said arbor is furnished with a threaded stem 23 adapted to enter the threaded bushing 8 in the anchor-plate 2. The clock-case 12 as herein shown, and preferably, is made wider at the bottom than at the top so that when in place its dial 21 will be tipped back from the vertical plane for easier observation.

To fasten the clock in place, it is set over the anchor-plate 2 so that the same will enter the recess 13 in its back 11 after which the clock is bodily lifted until the edge 15 of its hook 9 has been entered into the groove 16 in the fastening lug 14. The bezel 22, having by this time been removed, the key is applied to the triangular key-stem 19, of the arbor 18 and the same rotated for the entrance of its threaded stem 19 into the bushing 8, whereby the clock is securely hooked to the lower end of the anchor-plate and screwed to the upper end thereof. The key is now removed and the bezel 22 returned to place, leaving the anchor-plate entirely concealed and therefore perfectly protected. Furthermore the bezel 22 conceals even the hole 20 in the dial 21 and the triangular stem 19 of the arbor 18.

To remove the clock it is only necessary to unscrew the bezel 22 and apply the key for turning the arbor 18 until the threaded stem 22 has been disengaged from the bushing 8, after which the upper portion of the clock case is drawn away from the upper end of the plate sufficiently to permit the case to be moved downwardly and its lug 14 disengaged from the edge 15 of the hook 9 of the plate.

We claim:—

1. The combination with a clock-case having a recess in its back, of an anchor-plate adapted to completely enter the said recess and to be permanently fastened to the frame of an automobile, and means carried by the clock for removably attaching the same to the said plate.

2. The combination with a clock-case formed in its back with a recess, of an anchor-plate adapted to be permanently secured to an automobile frame and to be received within the said recess, and means, including a fastening-arbor, carried by the clock-case for removably connecting the same to the said plate which is entirely contained in the said recess when the clock-case is attached to it.

3. The combination with a clock-case formed in its rear face with a recess, of an anchor-plate adapted to be permanently attached to an automobile frame and to be entirely contained within the said recess, the lower end of the said plate and a portion of the clock-case coacting to form a hook; and a fastening arbor mounted in the case, operable through the front of the same and provided at its rear end with a threaded stem entering the upper end of the said plate.

4. The combination with a clock-case having its rear face formed with a recess having a lug in its lower end, of an anchor-plate adapted to be permanently fastened to an automobile frame, to completely enter the said recess and to be removably connected with the said lug, a tubular housing located in the upper portion of the said case, and an arbor mounted in the said housing, projecting at its upper end through an opening in the dial and having its rear end threaded for the entrance into the upper end of the said plate.

In testimony whereof, we have signed this specification in the presence of two subscribing witnesses.

DANIEL J. HURLEY.
FRANK W. SLAGER.

Witnesses:
HARRIETTE E. SINCLAIR,
EDWARD G. BATES.